US007085418B2

(12) United States Patent
Kaneko et al.

(10) Patent No.: US 7,085,418 B2
(45) Date of Patent: Aug. 1, 2006

(54) TEMPLATE MATCHING METHOD AND IMAGE PROCESSING DEVICE

(75) Inventors: Toshimitsu Kaneko, Kawasaki (JP); Osamu Hori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 757 days.

(21) Appl. No.: 10/087,935

(22) Filed: Mar. 5, 2002

(65) Prior Publication Data
US 2002/0154820 A1 Oct. 24, 2002

(30) Foreign Application Priority Data
Mar. 6, 2001 (JP) ............................ 2001-062567

(51) Int. Cl.
*G06K 9/68* (2006.01)
*G06K 9/62* (2006.01)
(52) U.S. Cl. ...................... 382/219; 382/218; 382/209
(58) Field of Classification Search ......... 382/216–221
See application file for complete search history.

(56) References Cited

U.S. PATENT DOCUMENTS 5,067,162 A * 11/1991 Driscoll et al. ............. 382/126
5,495,537 A * 2/1996 Bedrosian et al. .......... 382/209
5,602,937 A * 2/1997 Bedrosian et al. .......... 382/151
5,867,584 A * 2/1999 Hu et al. .................... 382/103
6,301,387 B1 * 10/2001 Sun et al. ................... 382/217
6,493,465 B1 * 12/2002 Mori et al. ................. 382/209
6,636,635 B1 * 10/2003 Matsugu .................... 382/218
6,658,145 B1 * 12/2003 Silver et al. ................ 382/149

OTHER PUBLICATIONS

Toshimitsu Kaneko, et al., "Object Tracking Method with Affine Deformation Estimation Using Robust Statistics", The Fifth Image Sensing Symposium, C-18, pp. 129-134.
Carlo Tomasi, et al., "Shape and Motion From Image Streams: A Factorization Method-Part 3, Detection and Tracking of Point Features", CMU-CS-91-132, School of Computer Science, Carnegie Mellon University, Pittsburgh, PA, Apr. 1991, pp. 1-32.

* cited by examiner

*Primary Examiner*—Bhavesh M. Mehta
*Assistant Examiner*—Utpal Shah
(74) *Attorney, Agent, or Firm*—Oblon, Spivak, McClelland, Maier & Neustadt, P.C.

(57) ABSTRACT

A template matching method for searching a matching area having the highest correlation with a template including a reference point in a first image from a second image, the template matching method comprising calculating a difference between a corresponding point of the reference point in the second image and an estimated point of the reference point which is calculated by the template matching method, and determining at least one of parameters of the template matching, the parameters comprising the reference point, a size of the template and resolutions of the first and second images based on the difference.

6 Claims, 7 Drawing Sheets

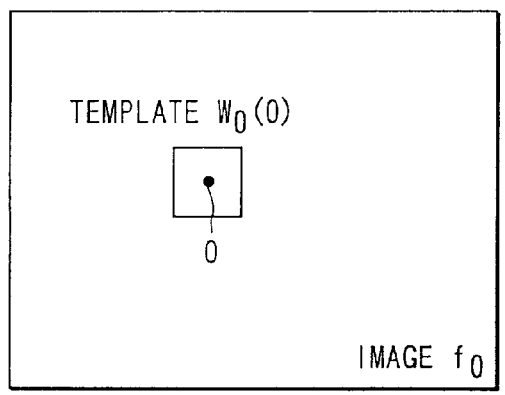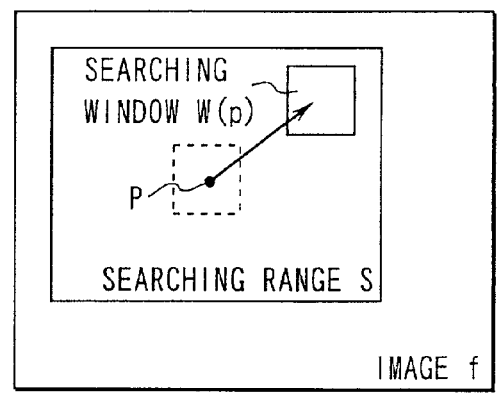
FIG. 7A  FIG. 7B
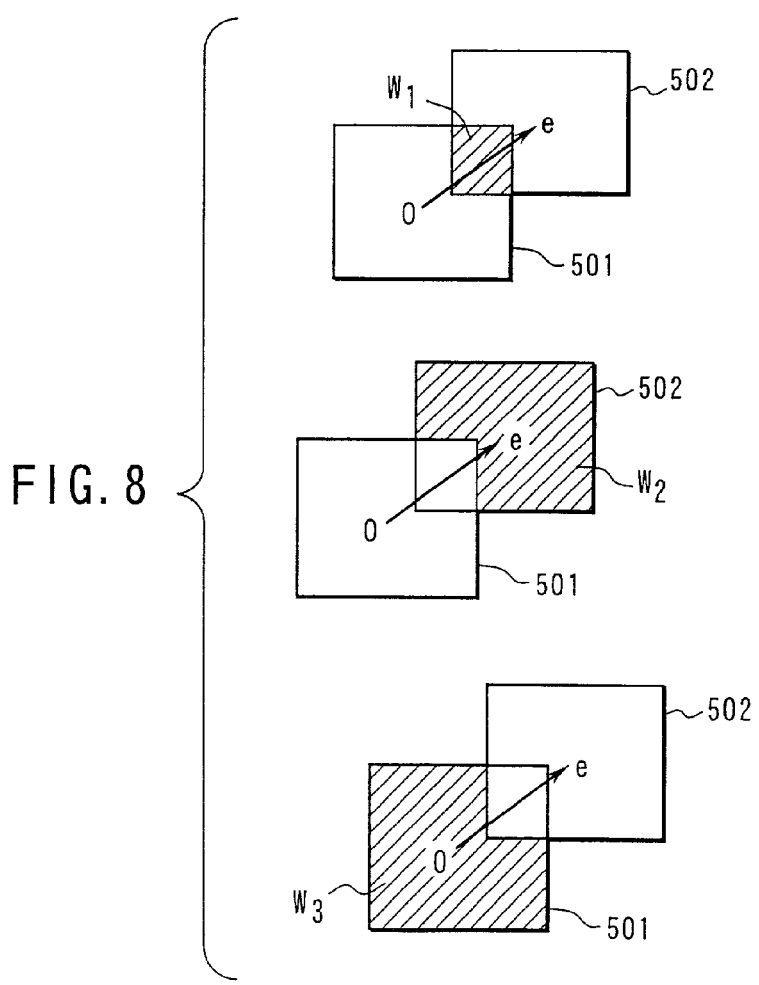
FIG. 8

TEMPLATE MATCHING METHOD AND IMAGE PROCESSING DEVICE

CROSS-REFERENCE TO RELATED APPLICATIONS

This application is based upon and claims the benefit of priority from the prior Japanese Patent Application No. 2001-062567, filed Mar. 6, 2001, the entire contents of which are incorporated herein by reference.

BACKGROUND OF THE INVENTION

1. Field of the Invention

The present invention relates to an image template matching method which is used when an object in a motion picture is tracked or when binocular stereopsis for reproducing a shape of an object from a plurality of images is performed, and an image processing device.

2. Description of the Related Art

A template matching is a technology for comparing a certain image with a template set in another image to obtain matching, and it is quite often utilized as a fundamental method for finding out points or areas corresponding to each other among a plurality of images. In order to track an object in a motion picture, an area analogically closest to a template, that is, an area having the highest correlation with the template (matching area) is searched from the following other frame images using an area of an object in an initial frame image of the motion picture as a template. Then, it is determined that the object has been moved to the matching area. On the other hand, in a binocular stereopsis, feature points corresponding to each other among a plurality of static images picked up from two or more different positions are found using one of the images as a template according to the template matching. A three dimensional shape of an object which has been picked up is calculated from positional information about a camera and information about position deviations among the corresponding feature points on the respective static images.

Regarding an object tracking in the motion pictures, when the entire object is used as a template, the precision of the template matching is lowered by the influence of the deformation of the object. Therefore, such a process should be employed that an appropriate number of tracking points are set within the object area, a template matching is performed using templates having an appropriate size containing the tracking points. A place to which the object is moved is determined from these template matched positions. In this case, it is desirable that the number of tracking points (the number of templates) is lessened as few as possible in order to shorten a calculating time.

In order to perform the tracking of an object in a short time with a high precision, a tracking point to which the template matching can be performed with a high precision must be selected. Similarly, also in the binocular stereopsis, the three-dimensional shape cannot be precisely calculated unless feature points to which the template matching can be precisely performed has been previously selected.

Thus, how to select tracking points or feature points is an important problem which has an influence on the performance. Hereinafter, the tracking point used for tracking an object in motion pictures and the feature point used for binocular stereopsis will be treated synonymously, and both are generically referred to as reference point.

Conventionally, as such a reference point, namely, a tracking point for tracking an object and a feature point for binocular stereopsis, a point where the variance of pixel values of surrounding pixels is large, a corner point, a point whose local curvature is large (see Reference 1: Toshimitsu Kaneko and Osamu Hori, "Object Tracking Method with Affine Deformation Estimation Using Robust Statistics", The fifth image sensing symposium, C-18, pp. 129–134, June, 1999) and the like are used. Moreover, a feature point suitable for gradient method by which an optical flow is found, which was proposed in Reference 2: Carlo Tomasi and Takeo Kanade, "Shape and Motion from Image Streams: a Factorization Method-part 3, Detection and Tracking of Point Features," CMU-CS-91-132, Carnegie Mellon University, 1991, has been also utilized.

However, since a method of selecting a point of which the dispersion of the values of surrounding pixels described above is large, a corner point, a point whose local curvature is large or the like as a reference point is based on the standard considered originally from the human intuition, it is not guaranteed that an appropriate reference point is selected. Particularly, since a method of making a point whose local curvature is large as a reference point is considered only for the portions of motion picture close to the reference point, it cannot determine that it is not appropriate as a reference point in the case where a similar pattern is located slightly apart from the reference point. Furthermore, since the method described in the Reference 2 is a method of selecting a feature point specialized for the gradient method, it cannot necessarily select an appropriate feature point as a reference point used for template matching.

On the other hand, also regarding the other parameters such as a size of template used for template matching, a resolution when the template matching is performed and the like except for a reference point, conventionally, since these are determined depending upon the human experiences and intuition, there is a problem that it is not certain whether or not an appropriate value is selected.

BRIEF SUMMARY OF THE INVENTION

Accordingly, the present invention is directed to method and apparatus that substantially obviates one or more of the problems due to limitations and disadvantages of the related art.

According to an embodiment of the present invention, a template matching method for searching a matching area having the highest correlation with a template including a reference point in a first image from a second image, the template matching method comprising:

calculating a difference between a corresponding point of the reference point in the second image and an estimated point of the reference point which is calculated by the template matching method; and determining at least one of parameters of the template matching, the parameters comprising the reference point, a size of the template and resolutions of the first and second images based on the difference.

According to an embodiment of the present invention, an article of manufacture comprising a computer usable medium having computer readable program code means embodied therein, the computer readable program searching a matching area having the highest correlation with a template including a reference point in a first image from a second image, the computer readable program code means comprising:

computer readable program code means for causing a computer to calculate a difference between a corresponding point of the reference point in the second image and an estimated point of the reference point which is calculated by the template matching method; and computer readable program code means for causing a computer to determine at least one of parameters of the template matching, the parameters comprising the reference point, a size of the template and resolutions of the first and second images based on the difference.

According to an embodiment of the present invention, an image processing device for searching a matching area having the highest correlation with a template including a reference point in a first image from a second image, comprising:

a calculation unit configured to calculate a difference between a corresponding point of the reference point in the second image and an estimated point of the reference point which is calculated by the template matching method; and a determination unit configured to determine at least one of parameters of the template matching, the parameters comprising the reference point, a size of the template and resolutions of the first and second images based on the difference.

BRIEF DESCRIPTION OF THE SEVERAL VIEWS OF THE DRAWING

FIGS. 7A and 7B are illustrating diagrams on the template matching in the first embodiment of the present invention;

FIG. 8 is a diagram showing an area within the template and a shifted template area in the first embodiment of the present invention.

DETAILED DESCRIPTION OF THE INVENTION

An embodiment of an image template matching method and an image processing device according to the present invention will now be described with reference to the accompanying drawings.

Figure 1:
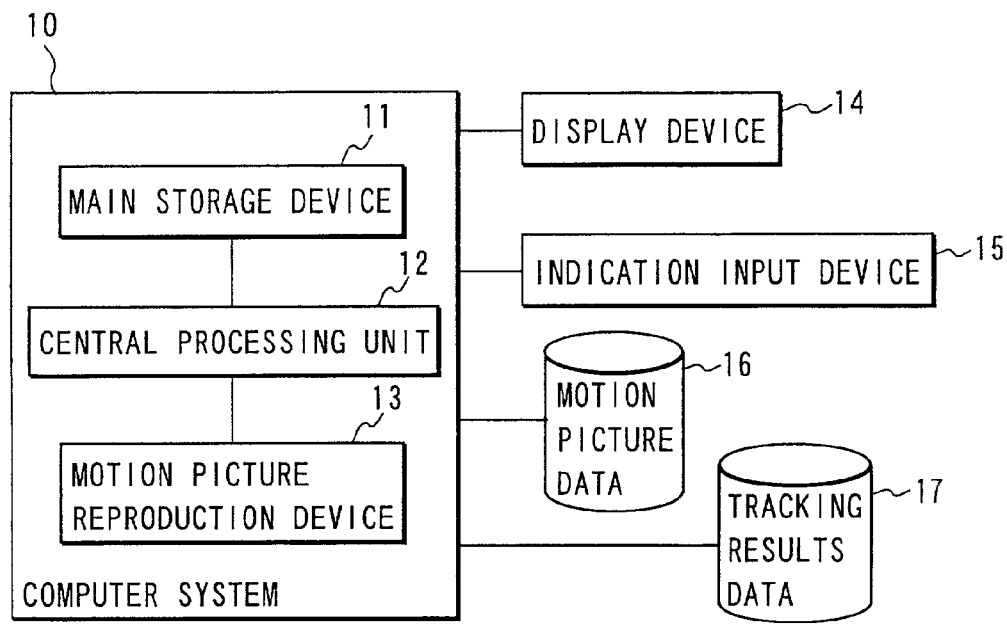
FIG. 1 is a block diagram showing a configuration of an image processing device of a first embodiment of the present invention.

Hereinafter, an embodiment of the present invention will be described with reference to the drawings. FIG. 1 is a blocking diagram showing an image processing device of a first embodiment of the present invention and showing an example in the case where the object tracking processing is performed.

In FIG. 1, a computer system 10 comprises a personal computer, an engineering workstation or the like which performs the image processing including the object tracking processing based on the present embodiment. In this example, the computer system 10 comprises a main storage device 11 which stores a program and data, a central processing unit (CPU) 12 which performs calculations and controls, and a motion picture reproduction device 13. The motion picture reproduction device 13 comprises, for example, a device which performs a predetermined image reproduction processing peculiar to a motion picture such as decompression of compressed motion picture data at a high speed. When a non-compressed motion picture is captured to the computer system 10, the motion picture reproduction device 13 is not necessarily needed. The computer system 10 may be a general purpose computer comprising the main storage device 11 and the central processing unit 12, and may be equipped with a function of capturing image data which is a processing object.

A display device 14 comprises, for example, a CRT monitor, a liquid crystal monitor or the like, and the display device 14 is connected to the computer system 10 and displays a variety of input screens and images. An indication input device 15 comprises, for example, a keyboard, a mouse, a touch panel or the like. A user can execute an indication that the tracking of an object is performed using the indication input device 15 and a specification of a tracking area to be described later, and the like.

In a recording medium for motion picture 16, motion picture data, which is an object of the object tracking processing, is recorded. As this recording medium 16, for example, a recording medium having a large capacity such as an optical disk, a hard disk or the like is used. In a recording medium for tracking results 17, data of the results of tracking an object, more specifically, area information of the object obtained as a result of performing the object tracking processing and information of time corresponding thereto or the frame number are associated and recorded.

It should be noted that although the recording medium for motion picture 16 and the recording medium for tracking results 17 are individual recording medium in FIG. 1, these might be a common medium. Moreover, in FIG. 1, although the recording media 16, 17 are located outside of the computer system 10, these may be located inside of the computer system 10.

(Template Matching Device)

Figure 2:
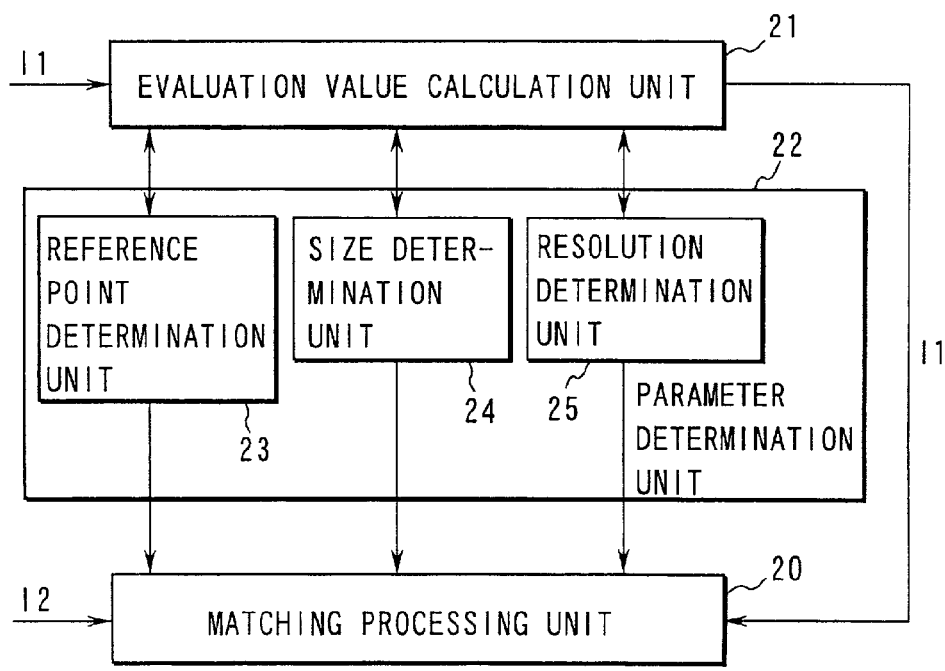
FIG. 2 is a block diagram functionally showing a configuration of a template matching device of the first embodiment of the present invention.

FIG. 2 is a block diagram showing functionally a configuration of a template matching device realized by the processing of the central processing unit 12 of FIG. 1. This template matching device comprises a matching processing unit 20, an evaluation value calculation unit 21 and a parameter determination unit 22, if it is roughly divided.

In the matching processing unit 20, an area having the highest correlation with the template (matching area) is searched from a second image I2 making the reference area including reference points in a first image I1 (in the case of tracking an object, a tracking point; and in the case of binocular stereopsis, a feature point) as a template.

In the evaluation value calculation unit 21, as described in detail later, the upper bound of the average distance (that is, the upper limitation of error) between the true corresponding point (assuming point) in the second image I2 corresponding to the reference point in the first image I1 and the corresponding point obtained by the template matching is calculated as an evaluation value. These evaluation values are given to the parameter determination unit 22.

In the present embodiment, the parameter determination unit 22 comprises a reference point determination unit 23 which determines reference points supplied to the template matching, a size determination unit 24 which determines a size of a template at the time of template matching, and a resolution determination unit 25 which determines resolutions of the first and second images I1 and I2 at the time of template matching. The determinations of these parameters, that is, the reference points, the size of the template and the resolution are performed on the basis of the evaluation values calculated by the evaluation value calculation unit 21.

In the matching processing unit 20, a matching processing is performed using the reference point, the size of the template and the resolution determined by the parameter determination unit 22. Moreover, in the parameter determination unit 22, the matching processing unit 20 is utilized at the time when the processing is performed for determining the reference point, the size of the template and the resolution on the basis of the evaluation values.

(Processing of Tracking Object)

Figure 3:
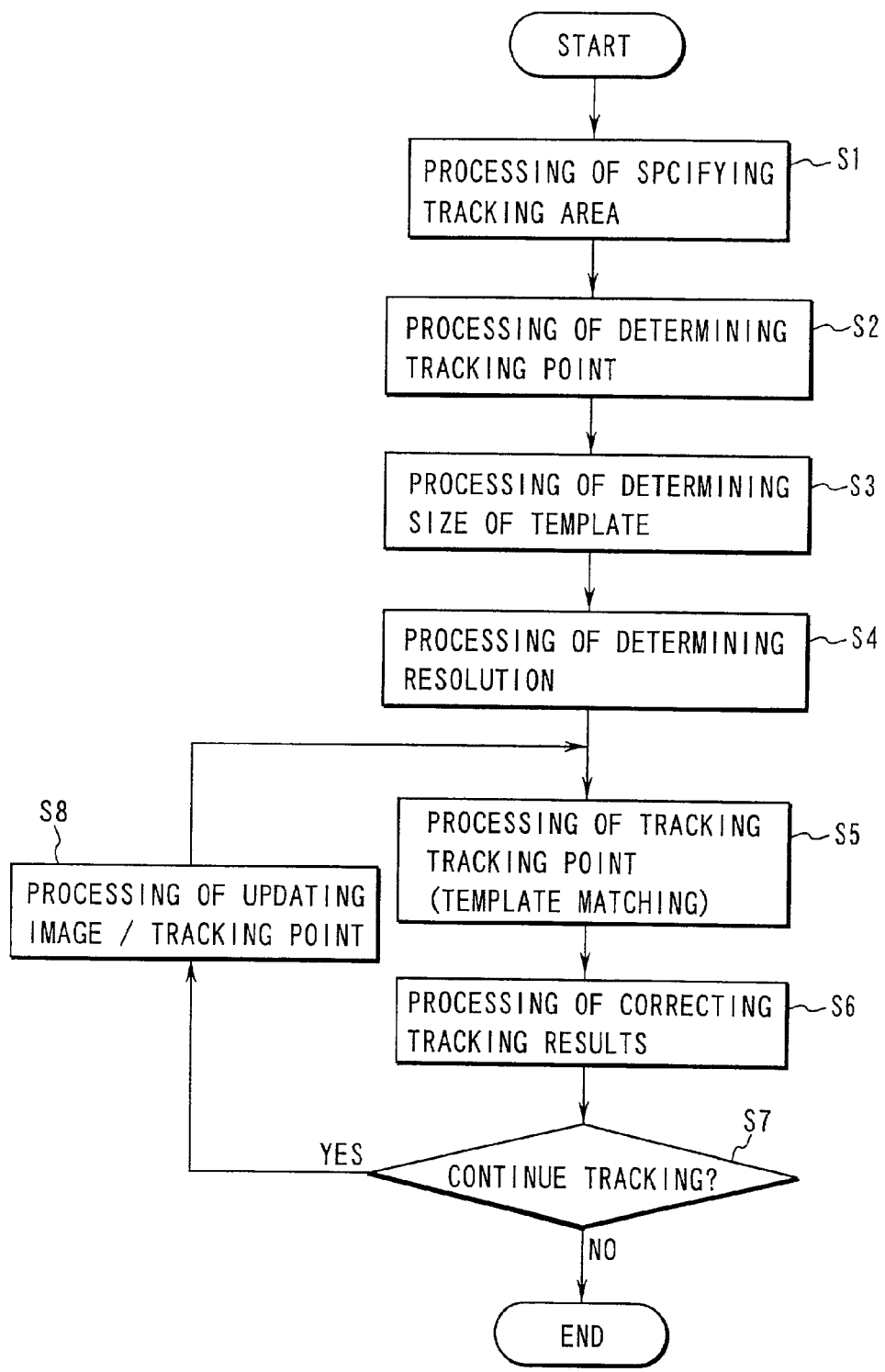
FIG. 3 is a flowchart showing a flow of the object tracking processing in the first embodiment of the present invention.

Next, the tracking of an object for tracking a moving object of motion pictures in the present embodiment using a flowchart shown in FIG. 3 will be described below. This processing of tracking an object is performed by the software processing in the computer system 10, especially in the central processing unit 12.

Upon the object tracking processing, first, the motion picture data recorded in the recording medium for motion picture data 16 is read by the computer system 10, and reproduced by the motion picture reproduction device 13. When the motion picture data recorded in the recording medium 16 is data compressed by MPEG method or the like, the decompression processing is performed in the motion picture reproduction device 13, and the original motion picture data is restored. The restored motion picture data is sent to the display device 14, and the motion pictures are displayed.

In order to track a moving object in the motion pictures thus displayed, first, in step S1, the processing of specifying the tracking area (reference area) where the moving object desired to be tracked on the initial frame image of the motion picture (first image I1) exists is performed. This processing is performed by specifying the area of the desired moving object of the motion picture as a tracking area using the indication input device 15 such as a mouse, a touch panel or the like while the user looks at the display of the motion pictures on the display device 14.

In step S2, the tracking point determining processing is performed by the reference point determination unit 23 of FIG. 2. In this processing, the pixels in the motion pictures in the tracking area specified in step S1 are made as tracking point candidates and the tracking points whose number has been previously determined by the user are selected. Where the tracking point is a representative point of the tracking area, in other words, a reference point to be a reference included in the template used at the time of template matching, for example, when the template is a rectangular block, the central point of the template is used.

In step S3, the processing of determining the size of the template is performed by the size determination unit 24 of FIG. 2.

In step S4, the processing of determining the resolution is performed by the resolution determination unit 25 of FIG. 2.

In step S5, the processing of tracking a tracking point determined in step S2 according to the resolution determined in step S6 using the template of the size determined in step S3. In this processing, in the matching processing unit 20 of FIG. 2, the tracking point is tracked by performing the template matching between a frame image (first image I1) where a position of the tracking point is already found and a frame image (second image I2) where a place of the tracking point to be moved is desired to be found. In order to simplify this processing of tracking, it is advantageous that a rectangular block in which the tracking point is made as the center is used as a template, however, even when an optional shape except for the rectangular shape is used as a template, the processing of tracking may be possible.

In step S6, the processing of correcting the tracking results obtained in step S5 is performed. That is, in the processing of tracking in step S5 (template matching), since it is not necessarily performed that the place of the tracking point to be moved is correctly found, in step S6, the processing of correcting the tracking results which are considered to be erroneous is performed while viewing the tracking results of the entire frame. Although a variety of methods can be applied to this processing of correction, for example, a method in which a deformation model of an object has been previously prepared and the place of the respective tracking points to be moved are determined using robust estimate (Jpn. Pat. Appln. KOKAI Publication No. 2000-132691) can be used.

In step S7, it is determined whether or not the tracking processing is continued, and when the processing of the frame to be an object of tracking was terminated, and when the reliability of the tracking results is low, the tracking is terminated.

When the tracking processing is continued in step S7, the processing of updating an image and the tracking points is performed in step S8. In this processing, the position of the tracking point is updated to the place to be moved of the tracking point newly found, and the frame image (second image I2) to be moved is updated to the frame image (first image I1) of the original place. Furthermore, the image data of the frame image (second image I2) where a new place to be moved should be found is read, and the processing of steps S5–S8 hereinafter is repeated until the processing of the tracking is terminated.

The place to be moved of the tracking point selected as a representative of the tracking area in the respective frame images is determined by the above-described series of object tracking processings. The place to be moved of the tracking area is obtained by deforming the initial tracking area in synchronization with the moving of the tracking point.

(Tracking Point Determining Processing)

Figure 4:
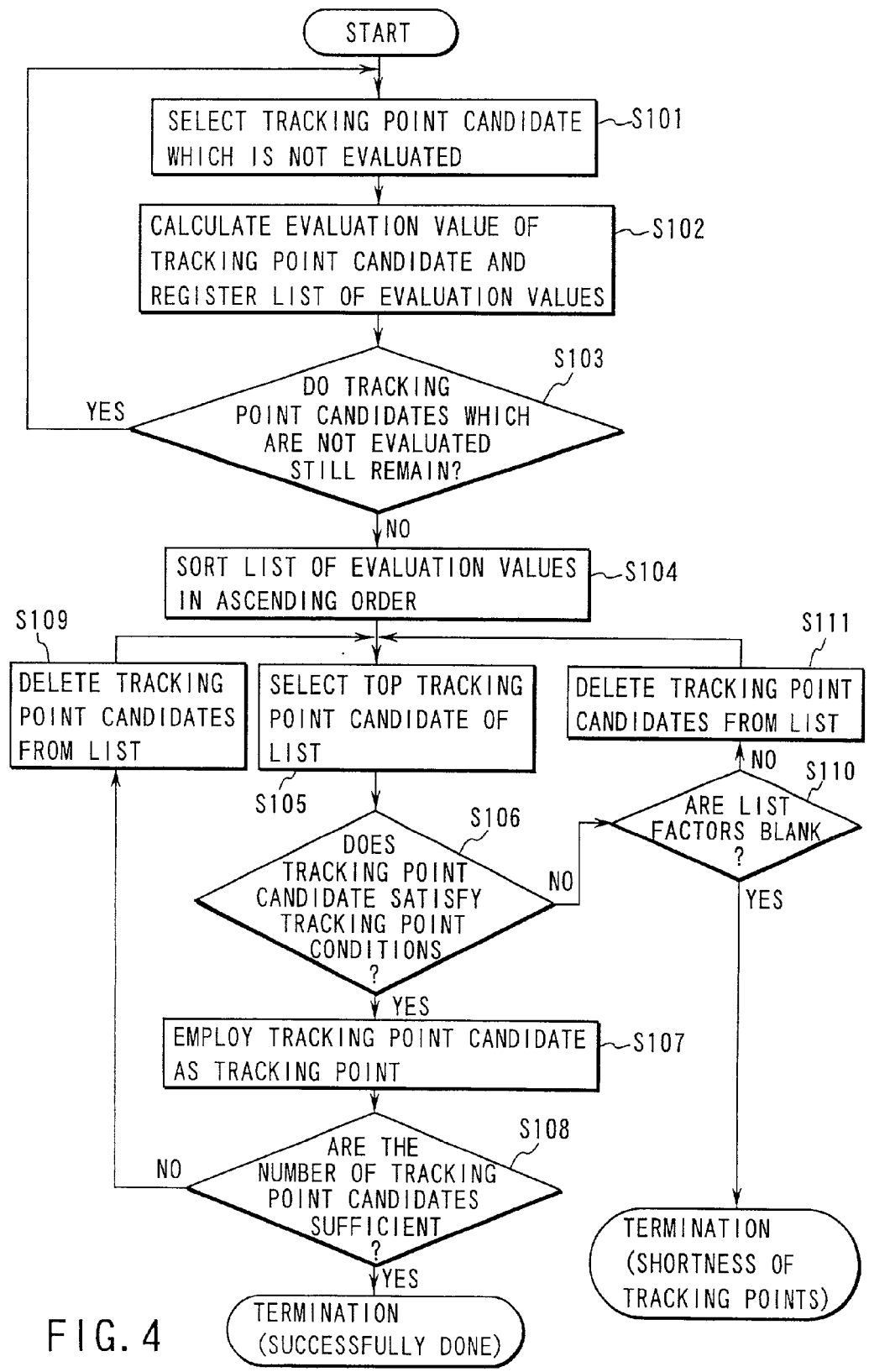
FIG. 4 is a flowchart showing a flow of the tracking point determining processing in FIG. 2.

Next, the tracking point determining processing of step S2 in FIG. 3 performed in the reference point determination unit 23 of FIG. 2 using a flowchart shown in FIG. 4 will be described in detail below.

First, a plurality of tracking point candidates (reference point candidates) are previously decided, and in step S101, one tracking point candidate which is not yet evaluated is selected from the set of these tracking point candidates (reference point candidates). The set of the tracking point candidates is usually made to be the entire area of an object desired to be tracked in the motion picture or the set of points which have sampled the area of the object desired to be tracked in the motion picture. When the processing of step S101 is executed at the first time, since all the tracking point candidates are not evaluated, optional tracking point candidates may be selected.

In step S102, the evaluation value is calculated per each tracking point candidate selected in step S101. This evaluation value is a value which has evaluated the magnitude of error (matching error) generated at the time when the template matching processing is performed in the matching processing unit 20 of FIG. 2 making a block whose each tracking point candidate is made as the center as a template. It is calculated in the evaluation value calculation unit 21. Where the shape of the template is made as a rectangular block whose tracking point is made as the center, however, the template may be in an arbitrary shape. Regarding the method of calculating the evaluation value, it will be described in detail later. The evaluation value calculated is registered on a list of the evaluation values prepared in the main storage device 11 of FIG. 1 as well as the information specifying the position of the tracking point candidate.

In step S103, it is determined whether or not unevaluated tracking point candidates, namely the tracking point candidates whose evaluation values are not calculated in step S102 remain. When they remain, the processing returns to step S101, and the processing proceeds to step S104 when the evaluation values are found on all of the tracking point candidates. In step S104, the evaluation values of the completed list of the evaluation values are sorted from the smallest value in ascending order.

In step S105, the top of the list of the evaluation values sorted in step S104, that is, the smallest evaluation value of the tracking point candidates registered in the list is selected.

In step S106, the tracking point candidate selected in step S105 is checked as to whether or not the selected tracking point candidate satisfies a predetermined tracking point condition. The tracking point conditions include determination conditions as to whether or not the tracking point candidate is appropriate as a tracking point, for example, the distance from the already determined tracking point is sufficiently apart (this is because the tracking points are apart to some extent) and the like.

In step S106, if the tracking point candidate selected in step S105 satisfies the tracking point conditions, the processing proceeds to step S107, the tracking point candidate satisfying the tracking conditions is employed as a tracking point, and for example, it is registered in the main storage device 11.

In step S108, it is determined whether or not the number of the tracking points registered in step S107 (accumulating totals) is sufficient, for example, whether or not the number of the tracking points achieves the predetermined number. When the number of the tracking points is sufficient, it is decided that the processing of determining the tracking point is successfully done, and the processing is terminated. When the number of the tracking points is not sufficient, the processing is proceeded to step S109, and the tracking point candidate selected in step S105 is deleted from the list of the evaluation values.

In step S106, when the tracking point candidate selected in step S105 does not satisfy the tracking point conditions, the processing proceeds to step S110, and it is determined whether or not the tracking point candidates remain in the list of the evaluation values. When the tracking point candidates do not remain in the list of the evaluation values, the processing is terminated as the number of the tracking points is short. When the tracking point candidates remain in the list of the evaluation values, the processing proceeds to step S111.

In step S111, similar to step S109, the processing of deleting the tracking point candidates selected in step S105 from the list of the evaluation values is performed.

The tracking points determined by the above-described processing are tracking points having smaller evaluation values, since the points are guaranteed that the template matching can be performed with small error, the template matching can be performed with a high precision making a rectangular block whose these tracking points are made as the center as the template.

On the other hand, in the binocular stereopsis using the template matching when the corresponding points of the feature points among a plurality of the images are found, for example, the left and right statistic images obtained by the cameras disposed at left and right are inputted as the first and second images I1 and I2, respectively, the feature points corresponding to each other between the left and right statistic images are made as reference points, the template matching is performed using the reference area including the feature point in the other image.

Even when such a binocular stereopsis is performed, since the precision of the template matching is enhanced by determining the feature points of the images instead of the tracking points as the feature points, it becomes possible to reproduce the shape with a high precision.

(Template Size Determining Processing)

Next, the processing of determining the size of the template shown in step S3 of FIG. 3 performed in the size determination unit 24 of FIG. 2 will be described in detail below. Also here, it is described defining the template is a rectangular block whose reference point (tracking point) is made as the center, however, the template may be in an arbitrary shape including the tracking point. Here the tracking point is already determined by the procedure described in FIG. 3, it will be described as only the size of the block whose tracking point is made as the center being determined as the template.

In step S201, the size of the block defined as the template is set as the minimum size in the range capable of being set. As the size of the template is larger, the better it is for making the error smaller, however, if it is larger, since the calculation cost is increased, the main point of the object of the present invention is to find out the smallest size in the range of the error being allowable.

In step S202, the minimum size set in step S201, or the evaluation value in the block size set as described later is calculated by the evaluation calculation unit 21 of FIG. 2. This evaluation value is a value evaluating the magnitude of error generated at the time when the template matching is performed making the block whose tracking point candidate is center as the template, and is identical with the evaluation value found in step S102 of FIG. 4.

In step S203, it is determined whether or not the evaluation value calculated in step S202 is smaller than a predetermined threshold value. When the evaluation value is smaller than the threshold value, the processing proceeds to step S206, otherwise, the processing proceeds to step S204, respectively. As the threshold value used here, for example, the value corresponding to the allowable error of the template matching is set.

In step S204, the block size set at present is compared with the maximum size of the block which is capable of being set. When the size of the block set at present is smaller than the maximum size of the block, the processing proceeds to step S205, otherwise, it is determined that the size of the block could not be selected, and the processing is terminated.

In step S205, the block size set is modified to the larger size of one rank graded up. This modification is, for example, performed by enlarging only the predetermined fixed pixel portion of the size of the block in the lengthwise and crosswise directions or by enlarging only the predetermined portion of percentage such as 10% increase or the like.

In step S206, the block size is determined as the size of the template at the time when the evaluation value is determined as it being smaller than the threshold value in step S203, the processing is terminated.

If a rectangular block whose tracking point given as the block size (template size) determined by the above-described processes is made as the center is used, since it is guaranteed that the template matching can be performed to this block with the error being small, the template matching can be performed with a high precision.

Moreover, in the binocular stereopsis using the template matching at the time when the corresponding points of the feature points among a plurality of the images are found, the precision of the template matching is enhanced and the reproduction of the shape is capable of being performed with a high precision by employing the size of the block selected by the above-described processes to the given feature point as the size of the template.

When the block size could not be selected, the processing is terminated, and it is not guaranteed that the error generated by the template matching is sufficiently small within the range of the size of the block capable of being set. Yet, if there is the necessity to perform the template matching using the given tracking point, the block having the size previously determined may be used. For example, the maximum size of the block sizes capable of being set is used and the template matching is performed.

(Resolution Determining Processing)

Figure 6:
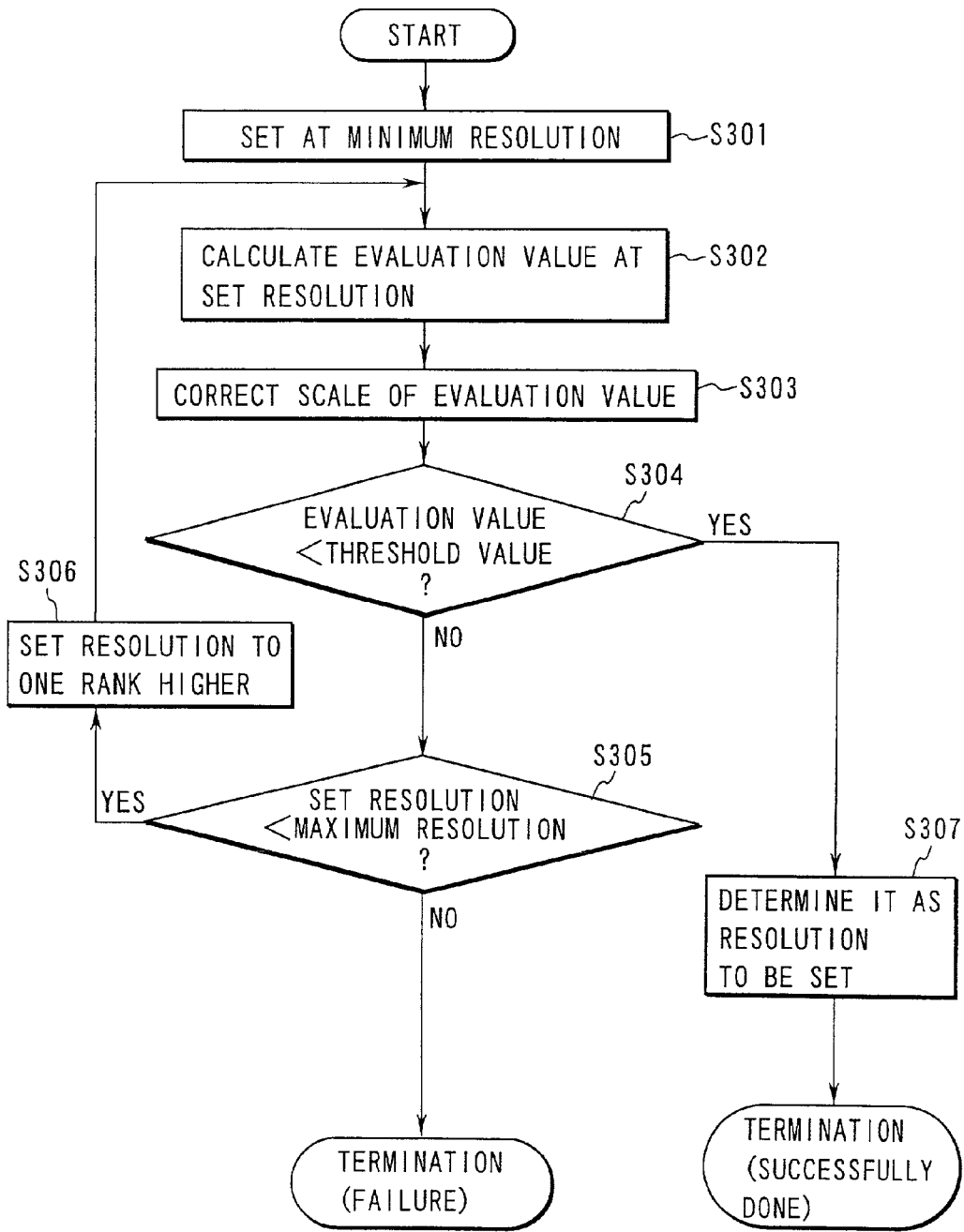
FIG. 6 is a flowchart showing a flow of the processing of determining an image resolution in the first embodiment of the present invention.

Next, the processing of determining the resolution of step S4 in FIG. 3 performed in the resolution determination unit 25 of FIG. 2 using the flowchart shown in FIG. 6 (the resolutions of the first and second images I1 and I2 at the time when the template matching is performed in the matching processing unit 20) will be described in detail below. Also here, it is described as the template being a rectangular block whose reference point (tracking point) is made as the center, however, the template may be in an arbitrary shape including the tracking point. Moreover, since the tracking point has been already determined by the procedure described in FIG. 3, the processing of determining the resolution will be described below as it determining only the image resolution at the time when the template matching is performed.

In step S301, the resolutions of the first and second images I1 and I2 are set as the minimum resolution (the coarsest resolution). This is because the main point of the object of the present embodiment is to find out the smaller resolution in the range of the error being allowable, since in order to make the error smaller, the resolution of an image is larger (denser), the better it is, but because the calculation cost is increased if it is made larger.

In step S302, an evaluation value under the resolution set at present is calculated. This evaluation value is a value evaluating the magnitude of the error generated at the time when the template matching was performed making the block whose tracking point candidate is made as the center as the template, fundamentally identical with the evaluation value found in step S102 of FIG. 4 and in step S202 of FIG. 5.

In step S303, the processing of correcting the scale of the evaluation value calculated in step S302 is performed. That is, since the evaluation value calculated in step S302 corresponds to the distance in the image (measured in a pixel unit and found), the evaluation values between the images having different resolutions cannot be compared. In order to avoid this problem, in step S303, the processing in which the evaluation value is converted into the scale in the maximum resolution (the densest resolution) is performed. This conversion processing is performed by multiplying the inverse number of the ratio of the resolution at present to the maximum resolution by the evaluation value. For example, when the resolution at present is ¼ of the maximum resolution, the evaluation value is multiplied by 4.

In step S304, the evaluation value after the scale is corrected in step S303 is compared with a predetermined threshold value previously determined. If the evaluation value is smaller than the threshold value, the processing proceeds to step S305. As for the threshold value used here, for example, a value corresponding to the allowable error of the template matching in the image of the maximum resolution is set.

In step S305, the resolution set at present is compared with the maximum resolution. If the resolution which is set is smaller than the maximum resolution, the processing proceeds to step S306, and the resolution which has been set is set by grading up the rank set at present to one rank higher (denser), otherwise it is made as the resolution not capable of being determined, the processing is terminated.

In step S304, the evaluation value is not smaller than the threshold value, the processing proceeds to step S307. In this step S307, the resolution giving the evaluation value determined as it being smaller than the threshold value in step S304 is determined as the resolution at the time when the template matching is performed. It is made as the determination of the resolution being successfully done, and the processing is terminated.

If a rectangular block whose tracking point given is made as the center is used for the first and second images I1 and I2 having the resolutions determined by the processing described above, since it is guaranteed that the template matching can be performed to this block with the error being small, the template matching can be performed with a high precision.

Moreover, in the binocular stereopsis using the template matching at the time when the corresponding points of the feature points between a plurality of the images are found, since the precision of the template matching is enhanced by applying the resolution determined by the above-described processes with respect to the given feature point to the first and second images I1 and I2, the reproduction of the shape is capable of being performed with a high precision.

(Processing of Calculating Evaluation Values of Tracking Point Candidate/Size of Template/Resolution)

Figure 5:
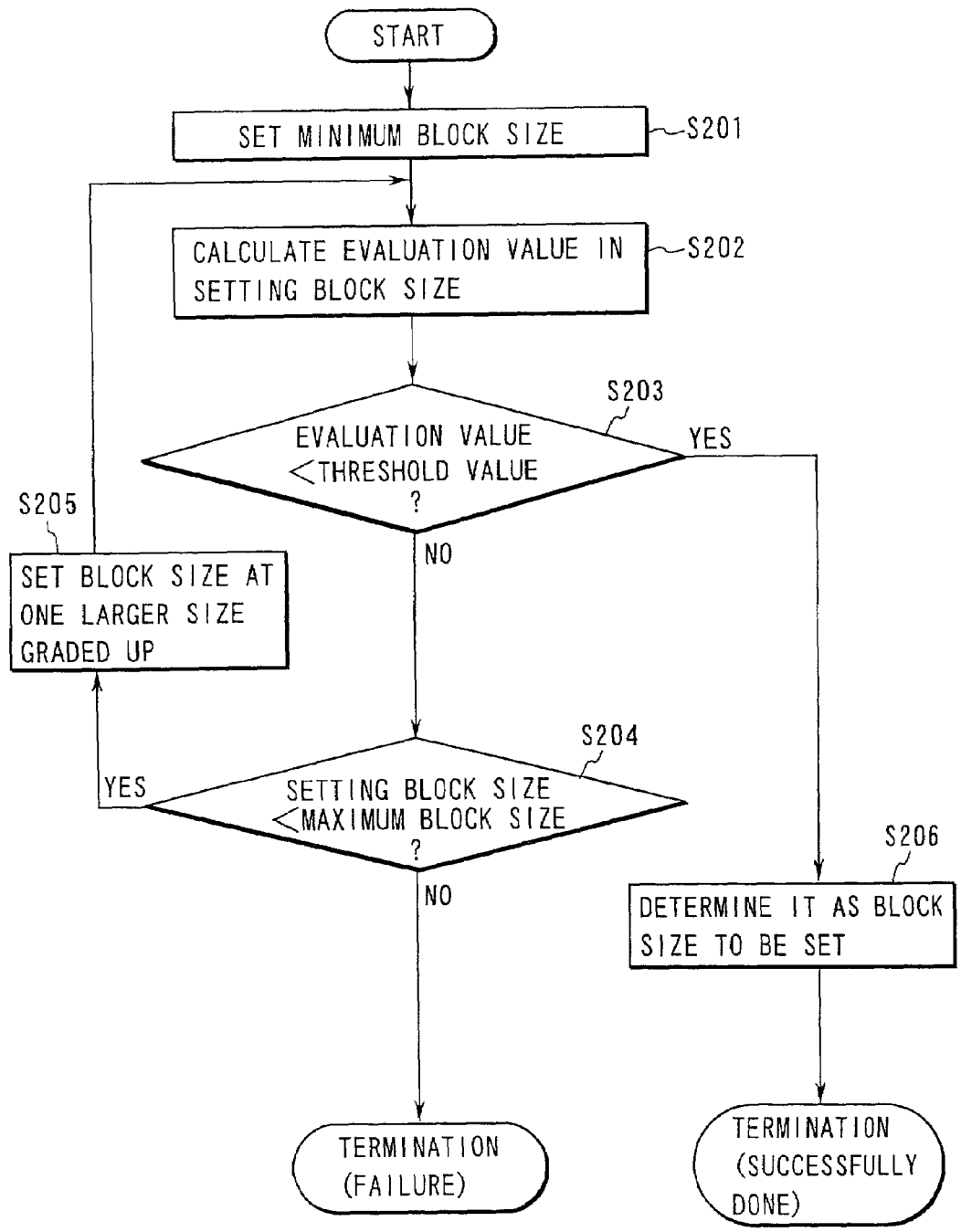
FIG. 5 is a flowchart showing a flow of the processing of determining a size of a template in the first embodiment of the present invention.

Next, the processing of the evaluation value calculation unit 21 of FIG. 2, that is, the processing of calculating the evaluation value in step S102 of FIG. 4, in step S202 of FIG. 5, and in step S302 of FIG. 6 will be described below. The evaluation value used here is a value evaluating the magnitude of the matching error generated at the time when the template matching is performed to the image of the candidate resolution making a rectangular block of candidate size whose tracking point candidate is made as the center as the template.

When it is considered that the reference area of the rectangular block including the tracking point (reference point) in the first image I1 is made as the template, the template matching for searching the matching area having the highest correlation with the template from the second image I2, there should exist the true corresponding point corresponding to the tracking point in the first image I1 in the second image I2. However, when the template matching is actually performed, it is possible that the point located at the point shifted from the true corresponding point is regarded as the corresponding point by the influence of the information of the image, noise or the like, the area in the second image I2 whose reference is made as the corresponding point of this position deviation is regarded as the matching area.

Thus, the distance between the true tracking point in the second image I2 (corresponding point corresponding to the tracking point in the first image I1) and the actual corresponding point which is the result of the searching by the template matching is a matching error referred to as herein. In the present embodiment, the upper bound of the average (average distance) of the relevant distance on the second image I2 is calculated as the evaluation value of the matching error from the first image I1. When S is a subset of a sequential set A, the element b of the set A as satisfying the expression of $x \leq b$ to all of x belonging to the set A is referred to as the upper bound b of the subset S, however, the upper bound used in the present embodiment is more particularly defined as follows:

It is assumed that an image including the template (corresponding to the first image I1) is represented as $f_0$, the objective image in which the matching area having the highest correlation with the template should be searched (corresponding to the second image I2) is represented as f, and the pixel at the coordinates p=(x, y) of the image is represented as f(p). Where, suppose that the coordinates of the reference point (tracking point) in the image $f_0$ as shown in FIG. 7A is made as the origin O, and the template is made as window $W_0$(O) whose tracking point is made as the center. Where, the processing for searching whether or not the template was moved to the window W(p) (referred to as searching window) whose any coordinates p (image) within all coordinates in the image f is made as the center in the searching range S (processing of determining the coordinates p) is the template matching in the present embodiment.

First, suppose that vector from the true tracking point in the image f (the true corresponding point corresponding to the reference point in the image $f_0$) to the corresponding point corresponding to the reference point in the image $f_0$ found by the template matching (error vector) is e. When a certain image f is specified, the error vector e is univocally determined.

In order to find the upper bound used in the present embodiment, first, the probability P(e) that an arbitrary error vector e is generated is evaluated. This is the same thing with evaluation of the incidence probability of the image f that the error vector becomes e.

Next, as to all the error vector e which has the possibility of being generated within the searching range (error vector found concerning with a plurality of the image f), by adding the product of the magnitude of the error |e| and the probability P(e) to it, the upper bound of the average distance as the evaluation value is obtained. Where, the average distance is a value that the distance between the true corresponding point (tracking point) in the image f and the corresponding point found by the template matching is found on a plurality of the images f and averaged as described above.

This evaluation value is analytically found by the calculation from the first image I1, specifically, by utilizing the error factors such as information of the first image I1, noises and the like. Hereinafter, the method of calculating the evaluation value in a concrete manner will be described below. It should be noted supposing that the change of the pixel value generated by the noises and deformations is according to the additional Gaussian noise of the dispersion $\sigma^2$.

As shown in FIG. 8, defining that the three areas $W_1$, $W_2$ and $W_3$ formed by the area of the template in the image f and the area in which the template is parallel displaced by the portion of the error vector e are $W_1 = W(O) \cap W(e)$, $W_2 = W^C(O) \cap W(e)$, and $W_3 = W(O) \cap W^C(e)$, respectively. Provided that $W^C$ represents complement of W. A block 501 in FIG. 8 is the first area to be the template, and a rectangular block whose true corresponding point is made as the center. A block 502 is the second area in which the block 501 is parallel displaced by the portion of the error vector e, and is a rectangular block whose point shifted from the true corresponding point is made as the center. Moreover, the averages $\gamma_1^2$ and $\gamma_2^2$ of the ratio of the pixel value within the areas of $W_1$, $W_2$ to the noise is defined by the following expression.

$$\gamma_1^2 = \frac{1}{|W_1|} \sum_{p \in W_1} \frac{\Delta^2(p, e)}{\sigma^2}, \quad \gamma_2^2 = \frac{1}{|W_2|} \sum_{p \in W_2} \frac{\Delta^2(p, e)}{\sigma^2} \quad (1)$$

Provided that the difference $f_0(p+e) - f_0(p)$ between the pixel value of coordinates p=(x, y) in the image $f_0$ and the pixel value of the coordinates in which the coordinates are parallel displaced by the portion of the error vector e is replaced with $\Delta(p, e)$. Furthermore, defining that the number of pixels of the respective areas are described as N=|W(O)|, R=|$W_2$|/|W(O)|.

At this time, the results of the template matching, the probability P(e) that the error indicated by the vector e is generated can be evaluated by the following expression:

$$P(e) \leq \exp\left\{1 - \frac{1}{2} N E_{TM}(e)\right\} \quad (2)$$

Provided that the following expression holds:

$$E_{TM}(e) = \max_{0 < \rho < 1} E_{TM}(e, \rho), \quad (3)$$

$$E_{TM}(e, \rho) = R\left\{\gamma_2^2 \frac{\rho}{1+\rho} + \log(1 - \rho^2)\right\} + (1 - R)\gamma_1^2 \rho(1 - \rho)$$

$E_{TM}(e)$ is non-similarity between the two blocks (the block 501 of the template and the block 502 that the block 501 is parallel displaced by the portion of the error vector e) shown in FIG. 8.

From the results described above, the average $\epsilon$ of the error generated by the template matching is represented by the sum of the expectation on all of the error vectors e within the searching range as follows:

$$\varepsilon \leq u = \sum_{e \in S} |e| P(e) \quad (4)$$

Where, u is the upper bound. When the template matching is performed using a certain tracking point (reference point) by this expression (4), it becomes possible to guaranteed that the magnitude of the average error (average distance) is u or less. It should be noted that here non-similarity (accumulation of square errors) between the two blocks 501 and 502 shown in FIG. 8 is considered in template matching, however, the similarity (a correlation coefficient between the images) may be used.

Thus, in the present embodiment, the template matching is capable of being performed with a high precision using the upper bound u evaluating the average of the magnitude (average distance) of the error of the template matching as the evaluation value with respect to the respective tracking point candidate/template size candidate/resolution candidate of the image by determining the parameters such as the tracking point (reference point), the size of the template, the resolution and the like.

Figure 9:
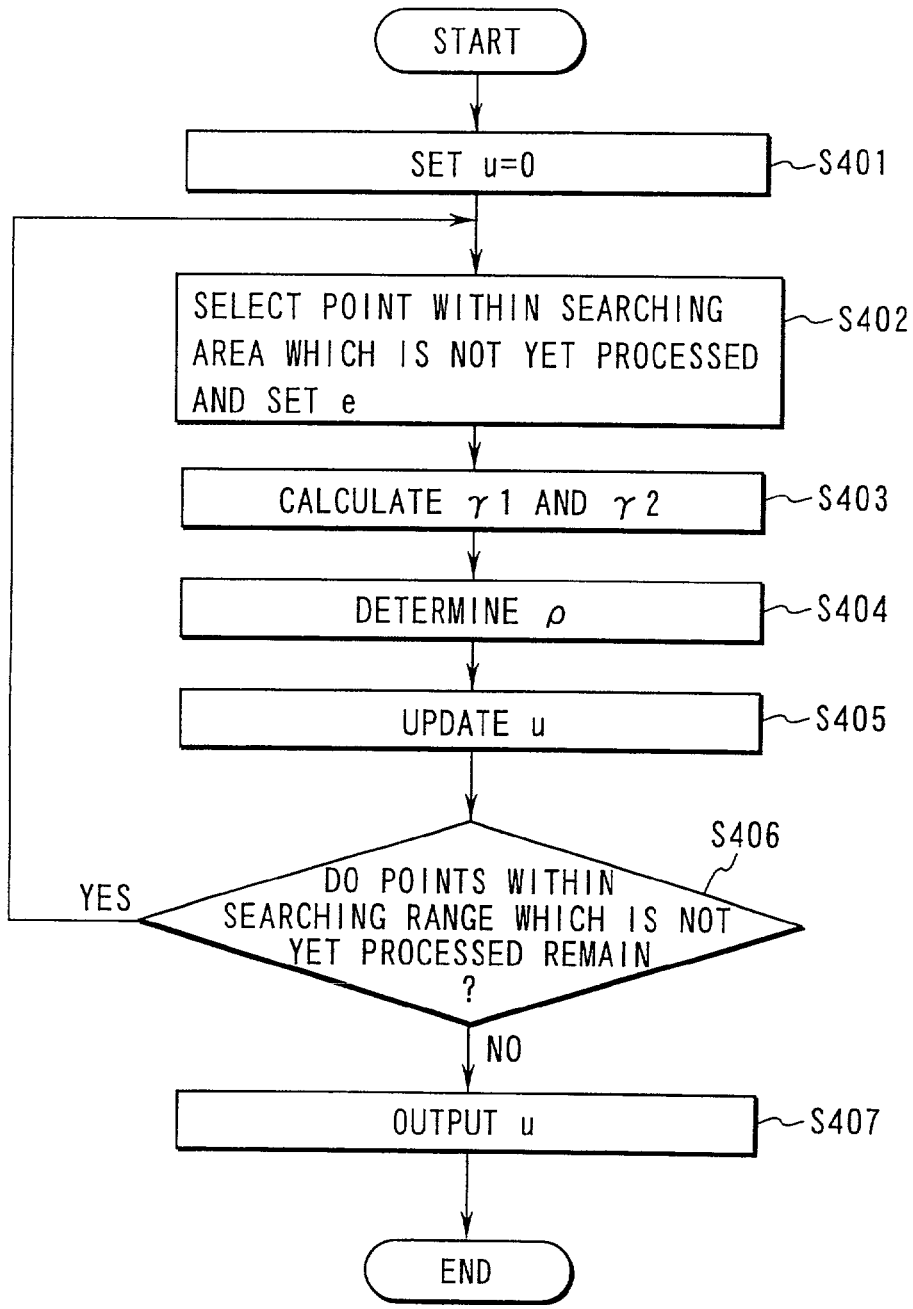
FIG. 9 is a flowchart showing a flow of the processing of calculating an evaluation value of the tracking point in the first embodiment of the present invention.

Next, the calculation procedure of the evaluation value u described above will be described below using the flowchart shown in FIG. 9. In the processing of calculating this evaluation value, the value of the upper bound with respect to the candidate of the given tracking point (reference point) is calculated.

In step S401, as the initialization processing, the initial value 0 is substituted for u.

In step S402, the tracking point candidate which has been not yet processed is selected from the searching range of the given tracking points. Then, the error vector e from the given tracking point (true corresponding point) to the selected tracking point (corresponding point) candidate is found.

In step S403, $\gamma_1$ and $\gamma_2$ are calculated from the given tracking points and the tracking point candidates selected in step S402.

In step S404, the value of $\rho$ is determined. $\rho$ is selected from the values within the range of 0–1 so that the value of $E_{TM}(e)$ is maximized. Therefore, as a method, a general descent method can be used. Furthermore, there is simply a method of appropriately sampling the values in the range of 0–1 and selecting the value giving the minimum $E_{TM}(e)$ as an approximate solution.

In step S405, $|e| \cdot \exp((-\frac{1}{2}) \cdot N \cdot E_{TM}(e))$ is added to the upper bound u.

In step S406, whether or not the tracking point candidates which has been not yet processed remain within the searching range is examined. If the tracking point candidates remain, the processing started from step S402 is repeated, otherwise, the processing proceeds to step S407, and the upper bound u is outputted as the evaluation value to the given tracking point candidate.

Although the evaluation value is calculated by the processing described above, this processing of calculating an evaluation value needs the throughput similar to that of the template matching being performed. In order to reduce the necessary throughput needed for calculating an evaluation value, it is effective that all of the pixels within the searching range are not made as the tracking point candidates, but the pixels are limited to one portion of the pixels within the searching range by sampling or the like. Moreover, if the points within the searching range selected in step S402 is also reduced by the similar method, the throughput of calculating the evaluation values can be reduced.

According tot the present embodiment, a template matching method for searching a matching area having the highest correlation with a template including a reference point in a first image from a second image, comprises: finding from said first image an error between a true corresponding point corresponding to said reference point in said second image and a corresponding point on calculation corresponding to said reference point found by template matching; and determining at least one parameter of (a) said reference point, (b) a size of said template and (c) resolutions of said first and second images on the basis of the error.

The determination of the reference point is performed, for example, by determining a reference point candidate giving the minimum evaluation value out of the evaluation values calculated respectively on a plurality of reference point candidates which may be a reference point.

The determination of the size of a template is performed, for example, by comparing the evaluation values respectively calculated when the size of the reference area to be a template is enlarged in a stepwise manner with the predetermined threshold value and determining the size of the reference area giving the smaller evaluation value than this threshold value as the size of the template.

The determination of the resolution is performed, for example, by comparing the evaluation values respectively calculated at the time when the resolutions of the first and second images are made higher in a stepwise manner with a predetermined threshold value and determining the resolutions of the first and second images giving the smaller evaluation value than this threshold value.

The calculation of the evaluation value is performed, for example, by calculating the non-similarity or similarity between the first area including the corresponding point of the second image and the second area in which the relevant first area is parallel translated within a predetermined searching range within the second image and using a plurality of non-similarities or similarities respectively calculated to a plurality of different second area within the searching range.

Moreover, according to the present invention, there is provided an image processing device comprising: an evaluation value calculation unit in which an upper bound of an average distance between a true corresponding point corresponding to a reference point in a second image and a corresponding point corresponding to a point found by the template matching is calculated as an evaluation value from a first image, and a parameter determination unit which determine at least one parameter of (a) the reference point in the first image, (b) a size of the template, and (c) resolutions of the first and second images.

Furthermore, according to the present invention, there is provided a program for making a reference area including a reference point in a first image as a template and causing a computer to execute a template matching processing for searching a matching area having the highest correlation with the template from a second image, the program for causing a computer to execute the template matching processing including a calculating processing in which an upper bound of an average distance between a true corresponding point corresponding to the reference point in the second image and a corresponding point corresponding to the reference point found by the template matching is calculated as an evaluation value from the first image and the processing of determining at least one parameter out of (a) the reference point in the first image, (b) a size of the template, and (c) resolutions of the first and second images.

It should be noted that although in the description described above, an example for determining all of the three parameters of the reference point, the size of the template and the resolution of the image at the time when the template matching is performed on the basis of the evaluation value has been described, needless to say, embodiments for determining only arbitrary one or two of these parameters might be also included in the present invention.

As described above, according to the present embodiment, the template matching is capable of being performed with a high precision by determining the parameters such as the reference point, the size of the template and the resolution of the image used at the time when the template matching is performed making the upper bound of the average distance directly related to the precision of the template matching as the evaluation value by the objective standard without depending upon the human experiences and intuition.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be implemented as a computer readable recording medium in which a program for allowing a computer to execute predetermined means, allowing the computer to function as predetermined means, or allowing the computer to realize a predetermined function is recorded.

What is claimed is:

1. A parameter determination method of a template matching searching from a second image a matching area having the highest correlation with a template including a reference point in a first image, method comprising:
    calculating, based on the first image, a difference between a corresponding point in the second image corresponding to the reference point and a calculated point in the second image which is obtained by the template matching; and
    determining, based on the difference, at least one of parameters of the template matching, the parameters comprising a location of the reference point, a size of the template and resolutions of the first and second images;
    wherein the difference comprises an upper bound of average distance between the corresponding point and the calculated point.

2. The method according to claim 1, wherein the calculating calculates the following upper bound u:

$$u = \sum_{e \in S} |e| P(e)$$

where, s is a searching range, e is an error vector, and P(e) is a probability that an error indicated by the error vector e is generated as a result of the template matching and is expressed as follows:

$$P(e) \leq \exp\left\{-\frac{1}{2} N E_{TM}(e)\right\}$$

where $$E_{TM}(e) = \max_{0 < \rho < 1} E_{TM}(e, \rho),$$

$$E_{TM}(e, \rho) = R\left\{\gamma_2^2 \frac{\rho}{1+\rho} + \log(1 - \rho^2)\right\} + (1 - R)\gamma_1^2 \rho(1 - \rho),$$

$$\gamma_1^2 = \frac{1}{|W_1|} \sum_{p \in W_1} \frac{\Delta^2(p, e)}{\sigma^2}, \gamma_2^2 = \frac{1}{|W_2|} \sum_{p \in W_2} \frac{\Delta^2(p, e)}{\sigma^2}$$

where $W_1 = W(O) \cap W(e)$, $W_2 = W^C(O) \cap W(e)$, and $W_3 = W(O) \cap W^c(e)$, $W^c$ represents complement of W, W(O) is a template having the corresponding point as the center, and W(e) is an area displaced by the error vector e.

3. An article of manufacture comprising a computer usable medium having computer readable program code means embodied therein, the computer readable program searching from a second image a matching area having the highest correlation with a template including a reference point in a first, the computer readable program code means comprising:
    computer readable program code means for causing a computer to calculate, based on the first image, a difference between a corresponding point in the second image corresponding to the reference point a calculated point in the second image which is obtained by template matching; and
    computer readable program code means for causing a computer to determine, based on the difference, at least one of parameters of the template matching, the parameters comprising a location of the reference point, a size of the template and resolutions of the first and second images;
    wherein the difference comprises an upper bound of average distance between the corresponding point and the calculated point.

4. The article of manufacture according to claim 3, wherein the calculating calculates the following upper bound u:

$$u = \sum_{e \in S} |e| P(e)$$

where, s is a searching range, e is an error vector, and P(e) is a probability that an error indicated by the error vector e is generated as a result of the template matching and is expressed as follows:

$$P(e) \leq \exp\left\{-\frac{1}{2} N E_{TM}(e)\right\}$$

where $$E_{TM}(e) = \max_{0 < \rho < 1} E_{TM}(e, \rho),$$

$$E_{TM}(e, \rho) = R\left\{\gamma_2^2 \frac{\rho}{1+\rho} + \log(1 - \rho^2)\right\} + (1 - R)\gamma_1^2 \rho(1 - \rho),$$

$$\gamma_1^2 = \frac{1}{|W_1|} \sum_{p \in W_1} \frac{\Delta^2(p, e)}{\sigma^2}, \gamma_2^2 = \frac{1}{|W_2|} \sum_{p \in W_2} \frac{\Delta^2(p, e)}{\sigma^2}$$

where $W_1 = W(O) \cap W(e)$, $W_2 = W^c(O) \cap W(e)$, and $W_3 = W(O) \cap W^c(e)$, $W^c$ represents complement of W, W(O) is a template having the corresponding point as the center, and W(e) is an area displaced by the error vector e.

5. An image processing device for searching from a second image a matching area having the highest correlation with a template including a reference point in a first image, comprising:

a calculation unit configured, based on the first I mage, to calculate a difference between a corresponding point in the second image corresponding to the reference point and a calculated point which is obtained by template matching; and a determination unit configured to determine, based on the difference, at least one of parameters of the template matching, the parameters comprising a location of the reference point, a size of the template and resolutions of the first and second images;

wherein the difference comprises an upper bound of average distance between the corresponding point and the calculated point.

6. The image processing device according to claim 5, wherein the calculation unit is configured to calculate the following upper bound u:

$$u = \sum_{e \in S} |e| P(e)$$

where, s is a searching range, e is an error vector, and P(e) is a probability that an error indicated by the error vector e is generated as a result of the template matching and is expressed as follows:

$$P(e) \leq \exp\left\{-\frac{1}{2} N E_{TM}(e)\right\}$$

where $$E_{TM}(e) = \max_{0 < \rho < 1} E_{TM}(e, \rho),$$

$$E_{TM}(e, \rho) = R\left\{\gamma_2^2 \frac{\rho}{1+\rho} + \log(1-\rho^2)\right\} + (1-R)\gamma_1^2 \rho(1-\rho),$$

$$\gamma_1^2 = \frac{1}{|W_1|} \sum_{p \in W_1} \frac{\Delta^2(p, e)}{\sigma^2}, \gamma_2^2 = \frac{1}{|W_2|} \sum_{p \in W_2} \frac{\Delta^2(p, e)}{\sigma^2}$$

where $W_1 = W(O) \cap W(e)$, $W_2 = W^c(O) \cap W(e)$, and $W_3 = W(O) \cap W^c(e)$, $W^c$ represents complement of W, W(O) is a template having the corresponding point as the center, and W(e) is an area displaced by the error vector e.

* * * * *